(12) United States Patent
Kuehner et al.

(10) Patent No.: US 11,548,545 B2
(45) Date of Patent: Jan. 10, 2023

(54) STEERING WHEELS HAVING AN ADJUSTABLE COEFFICIENT OF FRICTION

(71) Applicant: Toyota Research Institute, Inc., Los Altos, CA (US)

(72) Inventors: Manuel Ludwig Kuehner, Mountain View, CA (US); Jaime Camhi, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/573,075

(22) Filed: Jan. 11, 2022

(65) Prior Publication Data

US 2022/0281509 A1    Sep. 8, 2022

Related U.S. Application Data

(63) Continuation of application No. 17/194,695, filed on Mar. 8, 2021, now Pat. No. 11,254,343.

(51) Int. Cl.
*B62D 1/06* (2006.01)
*B62D 1/04* (2006.01)

(52) U.S. Cl.
CPC .............. *B62D 1/06* (2013.01); *B62D 1/046* (2013.01)

(58) Field of Classification Search
None
See application file for complete search history.

(56) References Cited

U.S. PATENT DOCUMENTS

| 2,157,950 | A | 5/1939 | Best |
| 6,481,312 | B1 | 11/2002 | Wissel |
| 6,533,184 | B1 | 3/2003 | Kim |
| 6,678,595 | B2 * | 1/2004 | Zheng .................... B62D 5/006 180/443 |
| 10,996,673 | B1 | 5/2021 | Katzourakis et al. |
| 11,242,081 | B1 * | 2/2022 | Kuehner .................. B62D 1/06 |
| 11,254,343 | B1 * | 2/2022 | Kuehner ................ B60W 50/16 |
| 2003/0187558 | A1 | 10/2003 | Zheng et al. |

(Continued)

FOREIGN PATENT DOCUMENTS

| CN | 20764447 U | 7/2018 |
| CN | 207657890 U | 7/2018 |

(Continued)

*Primary Examiner* — Vicky A Johnson
(74) *Attorney, Agent, or Firm* — Dinsmore & Shohl LLP

(57) ABSTRACT

A vehicle system including one or more sensors, a steering wheel including a rim and an adjusting mechanism for adjusting a coefficient of friction between a surface of the rim and a driver's hand, and a controller configured to determine whether a deviation factor between a target path and an actual path based on the one or more sensors exceeds a threshold deviation, send a first signal to the adjusting mechanism for operating to a first state in response to determining that the deviation factor exceeds the threshold deviation, the coefficient of friction being decreased when the adjusting mechanism is in the first state, and send a second signal to the adjusting mechanism for operating to a second state in response to determining that the deviation factor does not exceed the threshold deviation, the coefficient of friction being increased when the adjusting mechanism is in the second state.

20 Claims, 8 Drawing Sheets

(56) References Cited

U.S. PATENT DOCUMENTS

| | | | |
|---|---|---|---|
| 2003/0189493 A1* | 10/2003 | Klausner | ............ B62D 1/06 340/575 |
| 2007/0244641 A1 | 10/2007 | Altan et al. | |
| 2016/0313733 A1 | 10/2016 | Bellem et al. | |
| 2019/0039640 A1 | 2/2019 | Nishimura | |

FOREIGN PATENT DOCUMENTS

| | | | |
|---|---|---|---|
| JP | 2004203292 | A | 7/2004 |
| JP | 2006346110 | A | 12/2006 |
| JP | 3956848 | B2 | 8/2007 |
| JP | 2014098591 | A | 5/2014 |
| JP | 2015205636 | A | 11/2015 |

\* cited by examiner

STEERING WHEELS HAVING AN ADJUSTABLE COEFFICIENT OF FRICTION

CROSS-REFERENCE TO RELATED APPLICATION

This application is a continuation of U.S. patent application Ser. No. 17/194,695, filed Mar. 8, 2021, which is hereby incorporated by reference in its entirety.

TECHNICAL FIELD

The present specification generally relates to steering wheels and systems for adjusting a coefficient of friction at a surface of a steering wheel and, more specifically, steering wheels and systems for adjusting a coefficient of friction at a surface of a steering wheel to allow the vehicle to intervene a driver's control without harming or distracting the driver.

BACKGROUND

Vehicles may be equipped with various driver assist devices to ensure that a vehicle maintains a driving path along a particular route. Such driver assist devices may include devices for increasing torque to a steering wheel to guide the vehicle such as, for example, away from another vehicle or toward a center of a driving lane. However, it may be distracting to the driver of the vehicle to feel the steering wheel being pulled in a direction against the will of the driver. Further, this may interfere with a driver's intended driving routine such as, for example, when the driver intends to change lanes and the driver assist device applies resistance in an opposite direction.

Accordingly, a need exists for improved systems for allowing a vehicle to intervene with a driver's control of a steering wheel to adjust a driving operation of the vehicle without harming or distracting the driver.

SUMMARY

In one embodiment, a vehicle system includes one or more sensors, a steering wheel including a rim and an adjusting mechanism for adjusting a coefficient of friction between a surface of the rim and a driver's hand, and a controller configured to determine whether a deviation factor between a target driving path and an actual driving path of a vehicle during a driving segment exceeds a threshold deviation based on the one or more sensors, and operate the adjusting mechanism of the steering wheel of the vehicle to a first state in response to determining that the deviation factor exceeds the threshold deviation, thereby decreasing the coefficient of friction between the surface of the rim of the steering wheel and the driver's hand.

In another embodiment, a vehicle system includes a steering wheel including a rim and an adjusting mechanism for adjusting a coefficient of friction between a surface of the rim and a driver's hand, and a controller configured to send a first signal to the adjusting mechanism for operating the adjusting mechanism to a first state, and send a second signal to the adjusting mechanism for operating the adjusting mechanism to a second state, wherein the coefficient of friction when in the second state is greater than the coefficient of friction when in the first state.

In yet another embodiment, a method includes determining whether a deviation factor between a target driving path and an actual driving path of a vehicle during a driving segment exceeds a threshold deviation, and operating an adjusting mechanism of a steering wheel of the vehicle to a first state in response to determining that the deviation factor exceeds the threshold deviation, thereby decreasing a coefficient of friction between a surface of a rim of the steering wheel and a driver's hand.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
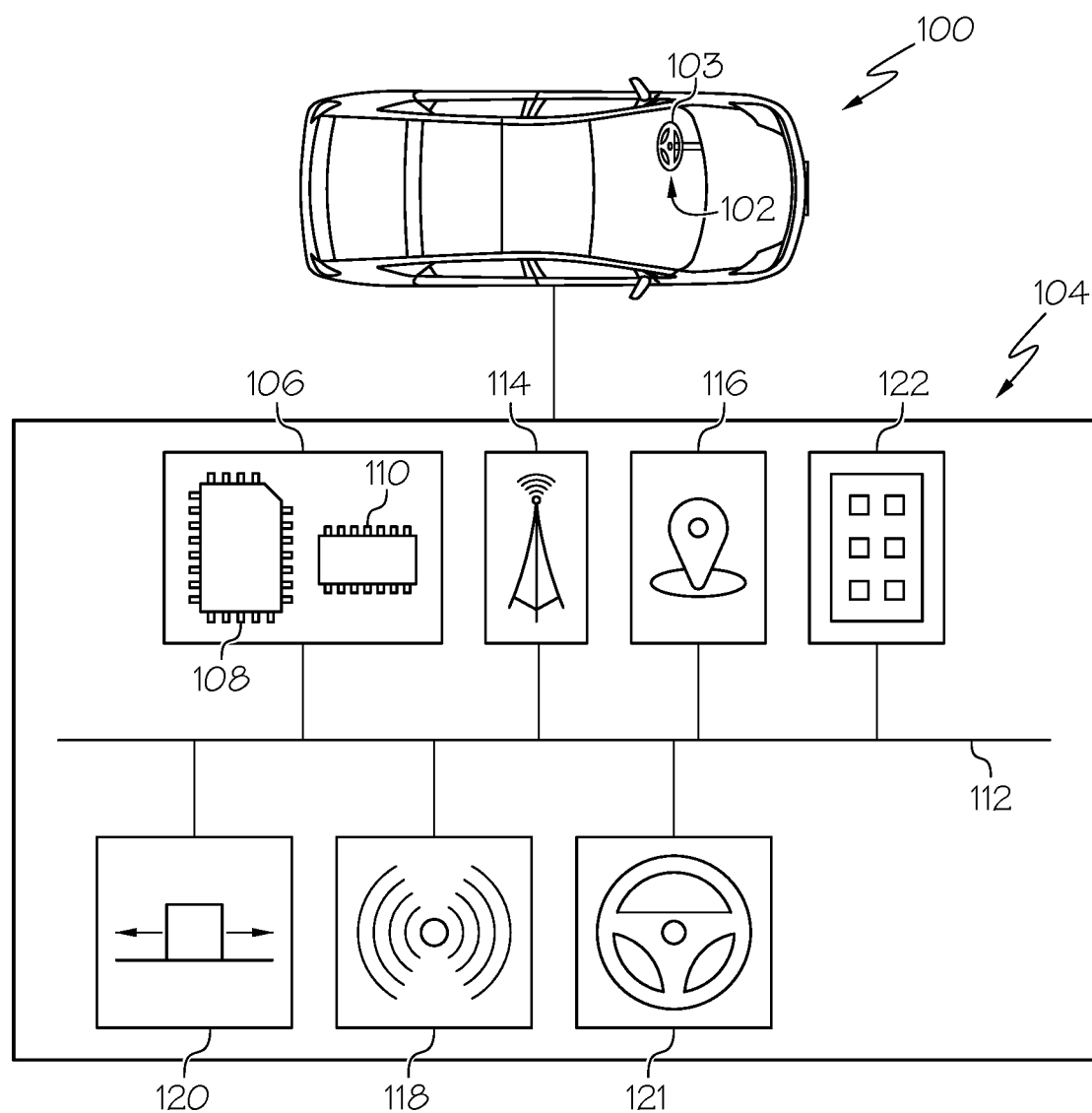
FIG. 1 schematically depicts a vehicle including a steering wheel and a vehicle system according to one or more embodiments shown and described herein.

Embodiments described herein are directed to steering wheels, vehicle systems, and methods for operating a steering wheel to adjust a coefficient of friction between a surface of the steering wheel and a driver's hands. The vehicle systems includes one or more sensors, a steering wheel, and a controller configured to adjust a coefficient of friction at a surface of the steering wheel based on a deviation factor between a target path and an actual path of the vehicle. As such, when the vehicle performs an intervening operation or an augmenting operation to adjust a steering direction of the steering wheel, resistance by the driver gripping the steering wheel may be increased or decreased as necessary to allow the intervening operation or augmenting operation.

Various embodiments of the vehicle systems, steering wheels, and methods of operation are described in more detail herein. Whenever possible, the same reference numerals will be used throughout the drawings to refer to the same or like parts.

Referring now to FIG. 1, a vehicle 100 is illustrated according to one or more embodiments described herein. The vehicle 100 may be an automobile or any other passenger or non-passenger vehicle such as, for example, a terrestrial, aquatic, and/or airborne vehicle including, but not limited, a bus, a scooter, a drone, and a bicycle. In some embodiments, the vehicle 100 may be an autonomous vehicle that navigates its environment with limited human input or without human input.

The vehicle 100 may generally include a steering wheel 102 for controlling a driving direction of the vehicle 100, and a vehicle system 104 for controlling adjustment of a coefficient of friction at a surface of the steering wheel 102 based on environment data received from one or more components of the vehicle system 104. As used herein, the term "coefficient of friction" refers to a ratio between the force necessary to move a driver's hand over the surface of the steering wheel 102, which the driver grips while driving. It should be appreciated that by adjusting the coefficient of friction at the steering wheel 102, the amount of control a driver has on the steering wheel 102 may be adjusted. For example, an increase in the coefficient of friction at the steering wheel 102 increases the driver's control of the steering wheel 102. Alternatively, a decrease in the coefficient of friction at the steering wheel 102 reduces the amount of control the driver has on the steering wheel 102 by allowing the steering wheel 102 to more easily move within the driver's grip. As discussed in more detail herein, when the coefficient of friction is decreased, the steering wheel 102 may be automatically rotated toward a correct direction with reduced resistance by the driver. As used herein, a correct driving operation and an incorrect driving operation refers to the vehicle 100 following a target path determined by the vehicle system 104 or avoiding an obstacle. The steering wheel 102 includes a rim 103, which the driver of the vehicle 100 grips to facilitate turning of the steering wheel 102 and controlling a driving direction of the vehicle 100 along an actual path.

As noted above, the vehicle 100 may be capable of automatically adjusting a steering direction of the steering wheel 102. In embodiments, the steering wheel 102 may include an actuator 121 that provides a torque control (e.g., rotation of the steering wheel 102). In a non-limiting example, in instances in which the driver rotates the steering wheel 102 in an incorrect direction, the actuator 121 may perform an "intervening" operation to rotate the steering wheel 102 in the opposite, correct direction. As described in more detail herein, a decrease in the coefficient of friction at the steering wheel 102 during rotation of the steering wheel 102 in the incorrect direction by the actuator 121 may result in an increased likelihood of the torque in the opposite, correct direction being accepted by the driver with less resistance. In another non-limiting example, in instances in which the driver rotates the steering wheel 102 in a correct direction, but not enough, the actuator 121 may perform an "augment" operation to apply additional torque to rotate the steering wheel 102 further in the correct direction. As described in more detail herein, an increase in the coefficient of friction at the steering wheel 102 during rotation of the steering wheel 102 in the correct direction may result in an increased likelihood of the torque in the correct direction being accepted by the driver.

As a non-limiting example, an increase in the coefficient of friction at the steering wheel 102 may indicate that the driver is performing a correct driving operation. Similarly, a decrease in the coefficient of friction at the steering wheel 102 may indicate that the driver is performing an incorrect driving operation and correction is required to steer the vehicle 100 along the target path. As discussed herein, operating parameters, such as in what instances the coefficient of friction at the steering wheel 102 will increase or decrease may be selected by a driver of the vehicle 100.

Referring still to FIG. 1, the vehicle system 104 of the vehicle 100 is shown including a controller 106 including one or more processors 108 and one or more memory modules 110. Each of the one or more processors 108 may be any device capable of executing machine readable and executable instructions. Accordingly, each of the one or more processors 108 may be a controller, an integrated circuit, a microchip, a computer, or any other computing device. The one or more processors 108 are coupled to a communication path 112 that provides signal interconnectivity between various modules of the vehicle system 104. Accordingly, the communication path 112 may communicatively couple any number of processors 108 with one another, and allow the modules coupled to the communication path 112 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 112 may be formed from any medium that is capable of transmitting a signal such as, for example, conductive wires, conductive traces, optical waveguides, or the like. In some embodiments, the communication path 112 may facilitate the transmission of wireless signals, such as WiFi, Bluetooth®, Near Field Communication (NFC) and the like. Moreover, the communication path 112 may be formed from a combination of mediums capable of transmitting signals. In one embodiment, the communication path 112 comprises a combination of conductive traces, conductive wires, connectors, and buses that cooperate to permit the transmission of electrical data signals to components such as processors, memories, sensors, input devices, output devices, and communication devices. Accordingly, the communication path 112 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the vehicle system 104 includes one or more memory modules 110 coupled to the communication path 112. The one or more memory modules 110 may comprise RAM, ROM, flash memories, hard drives, or any device capable of storing machine readable and executable instructions such that the machine readable and executable instructions can be accessed by the one or more processors 108. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 110. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, in embodiments, the vehicle system 104 includes network interface hardware 114. The network interface hardware 114 can be communicatively coupled to the communication path 112 and can be any device capable of receiving and transmitting data via a network. Accordingly, the network interface hardware 114 can include a communication transceiver for sending and/or receiving any wired or wireless communication. For example, the network interface hardware 114 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 114 includes hardware configured to operate in accordance with the Bluetooth® wireless communication protocol. For example, the network interface hardware 114 of the vehicle system 104 may receive environment data including navigation instructions and road data such as, for example, lane data, road curvature data, traffic data, and the like. As described herein, this environment data may be used to determine a target path along which the vehicle 100 should be driving or an obstacle that should be avoided.

In embodiments, the vehicle system 104 includes a location sensor 116 communicatively coupled to the other components of the vehicle system 104 via the communication path 112. The location sensor 116 may be, for example, a GPS module, configured to collect location data indicating a location of the vehicle 100. The location sensor 116 is configured to determine an actual path of the vehicle 100 while driving. Additionally, location data collected by the location sensor 116 is used to determine a deviation factor, i.e., how much the actual path of the vehicle 100 deviates from the target path.

Referring still to FIG. 1, the vehicle system 104 may include one or more sensors 118 such as, for example, a camera. In some embodiments, the one or more sensors 118 may include one or more optical components, such as a mirror, fish-eye lens, or any other type of lens. In some embodiments, the sensors 118 are configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors 118 described herein may include one or more LIDAR sensors, radar sensors, sonar sensors, or other types of sensors and that such data could be integrated into or supplement the data collection as described herein. Specifically, the sensors 118 of the vehicle system 104 collect additional environment data such as, for example, lane lines, nearby vehicles or obstacles, and the like. The collected environment data may also be used to determine a target path of the vehicle 100 to avoid departing from a specific lane or driving too close to other vehicles or obstacles.

The vehicle system 104 includes an adjusting mechanism 120 for adjusting the coefficient of friction at the steering wheel 102 based on the environment data and location data of the vehicle 100 received from the other components of the vehicle system 104. The adjusting mechanism 120 is communicatively coupled to the other components of the vehicle system 104 via the communication path 112. Specifically, the adjusting mechanism 120 receives information from at least the network interface hardware 114, the location sensor 116, and the one or more sensors 118, to determine whether the coefficient of friction at the steering wheel 102 should be adjusted by actuating the adjusting mechanism 120 corresponding to a deviation factor between the actual path the vehicle 100 is traveling and the target path, or toward an obstacle. In embodiments, the adjusting mechanism 120 may be configured to decrease a coefficient of friction at the steering wheel 102 when a deviation factor between the actual path and the target path, or movement toward an obstacle exceeds a threshold deviation. Similarly, the adjusting mechanism 120 may be configured to increase the coefficient of friction at the steering wheel 102 when the deviation factor does not exceed the threshold deviation. Specific embodiments of the adjusting mechanism 120 and operation thereof are discussed in more detail herein.

In embodiments, the vehicle system 104 includes the actuator 121, discussed herein, communicatively coupled to the other components of the vehicle system 104 via the communication path 112. The actuator 121 may be provided in a steering column extending from the steering wheel 102 to apply a torque in either a clockwise direction or a counterclockwise direction to the steering wheel 102 in response to a signal including instruction from one or more of the components of the vehicle system 104, as discussed herein.

In embodiments, the vehicle system 104 includes a control device 122 communicatively coupled to the other components of the vehicle system 104 via the communication path 112. The control device 122 includes one or more controls for selecting or adjusting operating parameters of the adjusting mechanism 120. The one or more controls may be any suitable user operating device such as, for example, buttons or the like. In some embodiments, the control device 122 includes a user interface, such as a touch screen user interface, for selecting or adjusting the operating parameters of the adjusting mechanism 120. For example, the control device 122 may be operated to select in what situations the coefficient of friction at the steering wheel 102 will be increased, in what situations the coefficient of friction at the steering wheel 102 will be decreased, to select a threshold deviation for determining a correct driving condition and an incorrect driving condition, and to select whether the coefficient of friction at the entire steering wheel 102 will be increased or decreased or only a portion thereof, for example, only adjusting those portions of the steering wheel 102 currently being gripped by the driver. It should be appreciated that selections of the above operating parameters may be assigned to a particular driver profile such that actuation of the adjusting mechanism 120 is specifically tailored to a particular driver of the vehicle 100. As such, a driver profile may be set as a default upon operating the vehicle 100 or selected from a plurality of driver profiles using the control device 122.

Figure 2:
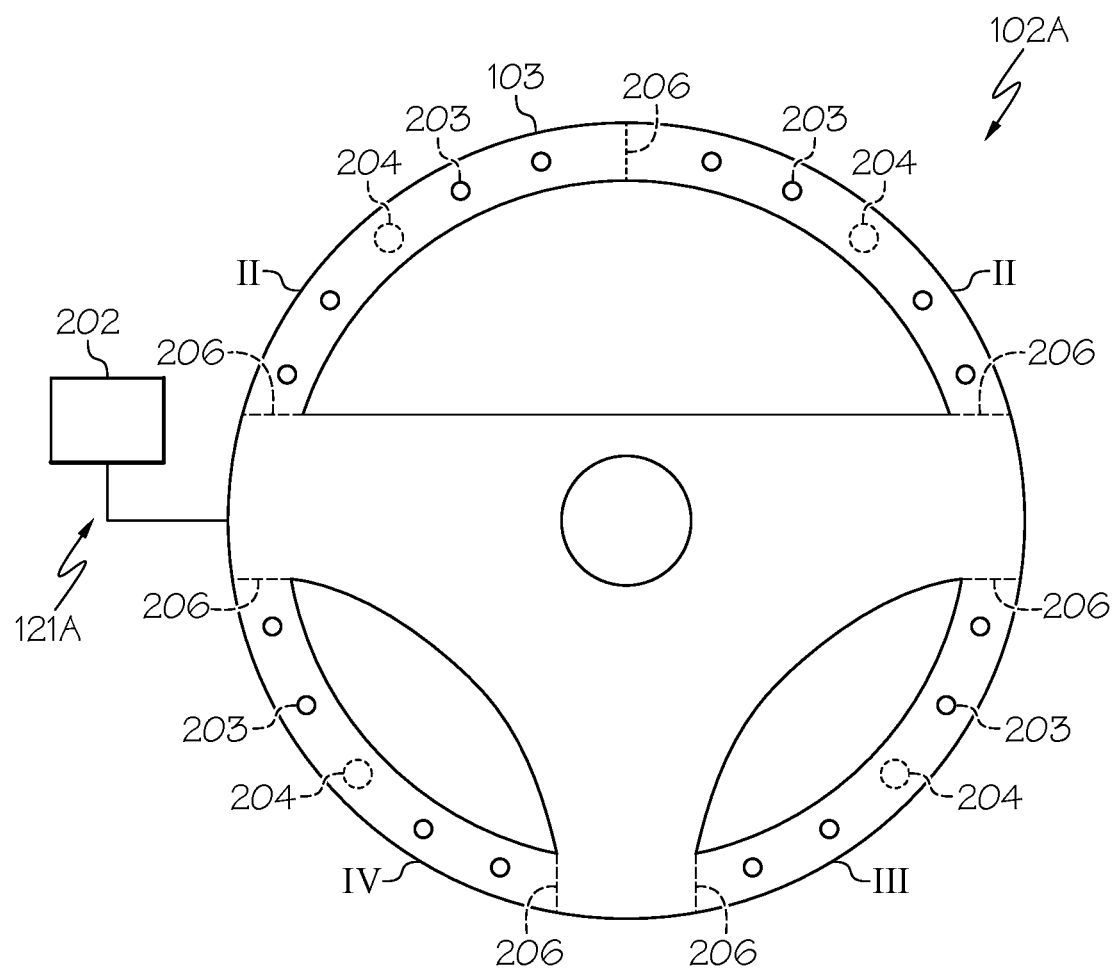
FIG. 2 schematically depicts a front view of an embodiment of a steering wheel of the vehicle according to one or more embodiments shown and described herein.

Referring now to FIG. 2, an illustrative embodiment of the steering wheel 102, depicted as steering wheel 102A, and an associated embodiment of the adjusting mechanism 120, depicted as adjusting mechanism 120A is illustrated. It should be appreciated that the steering wheel 102A and the adjusting mechanism 120A are only one example of the steering wheel 102 and the adjusting mechanism 120, respectively, that may be utilized having an adjustable coefficient of friction. As such, the present disclosure is not limited to the steering wheels 102 and adjusting mechanisms 120 illustrated and discussed herein.

The steering wheel 102A includes the rim 103 and the adjusting mechanism 120A for adjusting the coefficient of friction at the rim 103 of the steering wheel 102A. In embodiments, the adjusting mechanism 120A includes an air flow device 202, such as a pneumatic pump, a hydraulic pump, or the like, in fluid communication with the rim 103. The air flow device 202 is configured to control a flow of fluid such as, for example, air, to and from the rim 103 of the steering wheel 102, upon actuation of the adjusting mechanism 120A to adjust the coefficient of friction at the rim 103, as discussed herein. A plurality of holes 203 are formed in the rim 103 such that the air may flow from the air flow device 202 through a cavity formed in the rim 103 and out through the holes 203 or, alternatively, drawn into the rim 103 through the holes 203 by the air flow device 202. Accordingly, the adjusting mechanism 120A may be operated in a first state in which the air flow device 202 delivers air into the rim 103 and the air is dispensed out of the holes 203 in the rim 103. The air flowing out of the holes 203 creates an air cushion surrounding the rim 103, which reduces the coefficient of friction between the rim 103 of the steering wheel 102A and the driver's hands. Alternatively, the adjusting mechanism 120A may be operated in a second state in which the air flow device 202 draws air into the rim 103 through the holes 203. The air drawn into the rim 103 through of the holes 203 creates an air vacuum at the rim 103, which increases the coefficient of friction between the rim 103 of the steering wheel 102A and the driver's hands. Additionally, the adjusting mechanism 120A may be operated in a default state in which no air is delivered to the steering wheel 102A from the air flow device 202 nor drawn into the steering wheel 102A. This provides a coefficient of friction between that exhibited when the adjusting mechanism 120A operates in the first state and the second state.

Referring still to FIG. 2, the steering wheel 102A, as well as the steering wheel 102 generally, may include one or more pressure sensors 204 to detect an amount of force applied onto the steering wheel 102 by a driver when gripping the steering wheel 102A. The pressure sensors 204 may be located on or within the rim 103 and are communicatively coupled to the vehicle system 104. Further, in embodiments, the rim 103 may be partitioned into a plurality of sections I, II, III, IV separated by dividing walls 206 such that each section I-IV is not in direct fluid communication with any other section I-IV of the rim 103. Each section I-IV may include one or more pressure sensors 204. The air flow device 202 of the adjusting mechanism 120A, when provided, may be in fluid communication with each of the sections I-IV and configured to selectively deliver/draw air to/from only certain sections I-IV of the rim 103. For example, the air flow device 202 may be configured to deliver air to only certain sections of the steering wheel 102A including pressure sensors 204 that detect a pressure in excess of a threshold pressure, which indicates that the driver is gripping the steering wheel 102A at that particular section. Thus, in embodiments, only the section(s) of the steering wheel 102A currently being gripped by the driver are adjusted by the adjusting mechanism 120A. As a non-limiting example, if only the pressure sensor 204 positioned in section I detects a pressure being applied in excess of the threshold pressure, such as when the driver is driving with one hand, the air flow device 202 may be operated to only deliver air to section I of the rim 103 in any suitable manner, such as by controlling a specific air flow line in fluid communication with section I. As another non-limiting example, if the pressure sensors 204 positioned in section I and section II both detect a pressure being applied in excess of the threshold pressure, such as when the driver is driving with both hands, the air flow device 202 may be operated to only deliver air to section I and section II of the rim 103. It should be appreciated that the disclosure of the rim 103 being separated into individual sections I-IV is not limited to the specific embodiment of the steering wheel 102A discussed herein and may be equally applicable to other embodiments of the steering wheel 102 generally.

Figure 3:
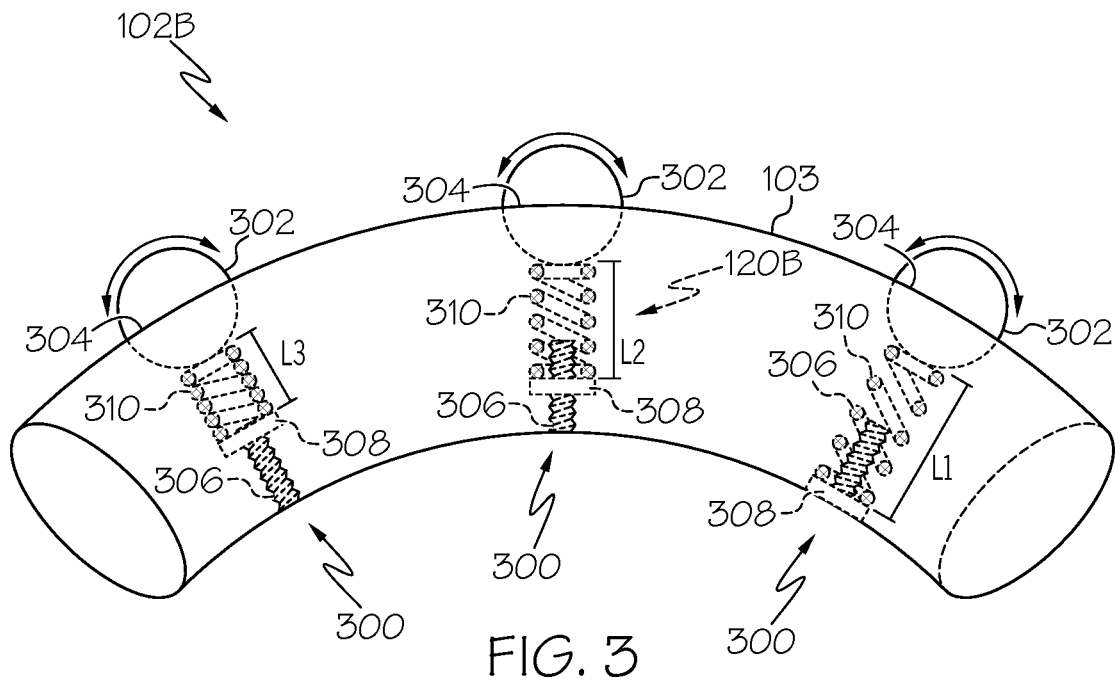
FIG. 3 schematically depicts a partial front view of an embodiment of a steering wheel of the vehicle according to one or more embodiments shown and described herein.

Referring now to FIG. 3, another illustrative embodiment of the steering wheel 102 is discussed herein and depicted as steering wheel 102B is shown. A partial view of the rim 103 of the steering wheel 102B is shown including another illustrative embodiment of the adjusting mechanism 120 depicted as adjusting mechanism 120B. The adjusting mechanism 120B includes a plurality of rotation devices 300 spaced apart from one another and extending radially through an interior of the rim 103 of the steering wheel 102B. Each rotation device 300 includes a rotatable sphere 302 protruding out of an opening 304 formed in the surface of the rim 103 such that the sphere 302 makes contact with the hand of a driver on the rim 103. The spheres 302 are rotatable within the opening 304 at the surface of the rim 103. As described herein, a resistance to rotation of the spheres 320 is decreased when the adjusting mechanism 120B is in a first state, thereby decreasing the coefficient of friction at the rim 103, and the resistance to rotation of the spheres 302 is increased when the adjusting mechanism 120B is in the second state, thereby increasing the coefficient of friction at the rim 103. Additionally, the adjusting mechanism 120B may be operated in a default state in which resistance to rotation of the spheres 302 is between that exhibited when in the first state and the second state and, thus, the coefficient of friction is between that exhibited when in first state and the second state.

In embodiments, each rotation device 300 further includes a threaded shaft 306 extending radially through the cavity of the rim 103, a plate 308 threadedly attached to the shaft 306 and rotatably fixed relative to the rim 103, and a spring 310 positioned between the plate 308 and the sphere 302. While three rotation devices 300 are illustrated at a section of the rim 103 in different states, it should be appreciated that, in embodiments, each of the rotation devices 300 or at least those rotation devices 300 located within the same section of the rim 103 may be operated at the same state simultaneously. However, for purposes of illustrating the different states, a first rotation device 300 (right) is shown in the first state, a second rotation device 300 (left) is shown in the second state, and a third rotation device 300 (center) is shown in the default state.

With respect to the rotation device 300 (right) of the adjusting mechanism 120B operating in the first state, the shaft 306 of the rotation device 300 rotates in a first direction such that the plate 308 moves toward an inner radial surface of the rim 103 and away from the sphere 302, thereby providing the spring 310 with a length L1 and reducing a compression force of the spring 310 against the sphere 302. When the length L1 of the spring 310 is increased, i.e., the compression force of the spring 310 against the sphere 302 is reduced, which reduces the resistance of the sphere 302 rotating within the opening 304 of the rim 103, thereby decreasing the coefficient of friction at the rim 103. Alternatively, with respect to the rotation device 300 (left) of the adjusting mechanism 120B operating in the second state, the shaft 306 rotates in an opposite second direction such that the plate 308 moves toward an outer radial surface of the rim 103 and toward the sphere 302, thereby providing the spring 310 with a length L3, which is less than the length L1 when in the first state. This increases the compression force of the spring 310 against the sphere 302. When the length L3 of the spring 310 is decreased, i.e., the compression force of the spring 310 against the sphere 302 is increased, the spring 310 increases the resistance of the sphere 302 rotating within the opening 304 of the rim 103, thereby increasing the coefficient of friction at the rim 103. With respect to the rotation device 300 (center) of the adjusting mechanism 120B operating in the default state, the shaft 306 is rotated in either the first direction or the second direction such that the plate 308 is positioned along the shaft 306 to a location between that location exhibited in the first state and the second state. In the default state, the spring 310 has a length L2, which is less than the length L1 of the spring 310 when in the first state and greater than the length L3 of the spring 310 when in the second state. This provides a compression force of the spring 310 against the sphere 302 and a coefficient of friction at the rim 103 between those exhibited when in the first state and the second state.

Figure 4:
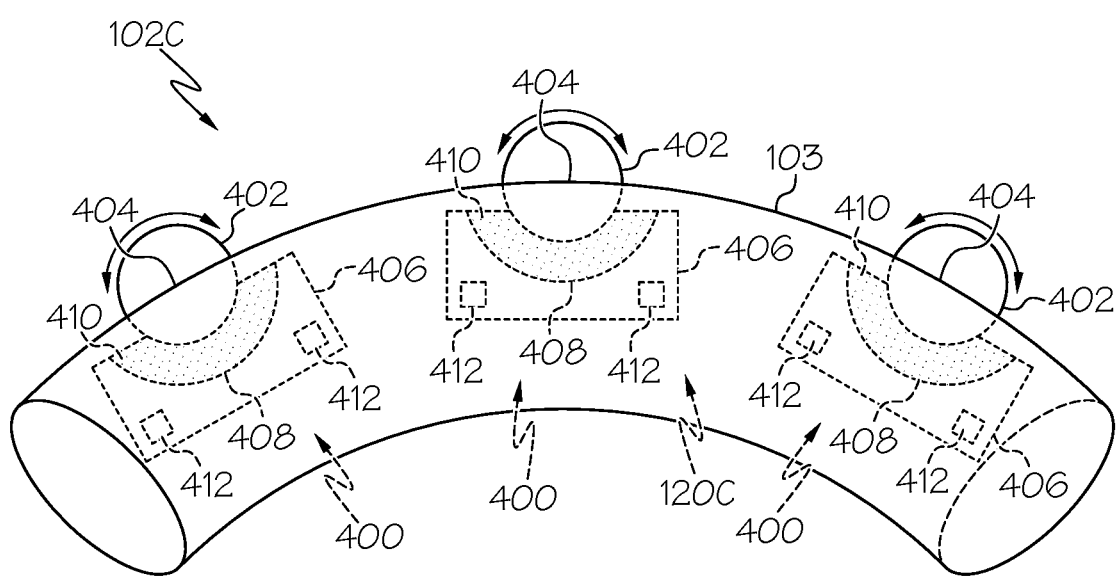
FIG. 4 schematically depicts a partial front view of an embodiment of a steering wheel of the vehicle according to one or more embodiments shown and described herein.

Referring now to FIG. 4, another illustrative embodiment of the steering wheel 102 is depicted as steering wheel 102C. A partial view of the rim 103 of the steering wheel 102C is shown including another illustrative embodiment of the adjusting mechanism 120 depicted as adjusting mechanism 120C. As with the adjusting mechanism 120B, the adjusting mechanism 120C includes a plurality of rotation devices 400 spaced apart from one another and extending radially through the cavity of the rim 103 of the steering wheel 102C. Each rotation device 400 includes a rotatable sphere 402 protruding out of an opening 404 formed in the surface of the rim 103 wherein a resistance to rotation of the spheres 402 is decreased when the adjusting mechanism 120C is in the first state, thereby decreasing the coefficient of friction at the rim 103, and the resistance to rotation of the spheres 402 is increased when the adjusting mechanism 120C is in the second state, thereby increasing the coefficient of friction at the rim 103. The adjusting mechanism 120C may be operated in the default state in which resistance to rotation of the spheres 402 is between that exhibited when in the first state and the second state and, thus, the coefficient of friction is between that exhibited when in the first state and the second state.

In embodiments, each rotation device 400 further includes a housing 406 defining a sealed cavity 408 between the sphere 402 and the housing 406, a magnetorheological (MR) fluid 410 provided within the cavity 408, and one or more coils 412 provided within the housing 406 configured to generate a magnetic field to adjust a viscosity of the magnetorheological fluid 410. The sphere 402 rests within the cavity 408 of the housing 406, which may be sealed around the sphere 402 by a gasket or the like, such that an outer surface of the sphere 402 is in contact with the MR fluid 410. As referred to herein, "MR fluid" refers to a type of fluid that, when subjected to a magnetic field, greatly increases its viscosity to the point of becoming a viscoelastic solid. When the adjusting mechanism 120C is in the first state, the coils 412 do not generate a magnetic field and, thus, the MR fluid 410 has a low viscosity. The low viscosity of the MR fluid 410 contacting the sphere 402 reduces resistance of the sphere 402 from rotating within the opening 404 of the rim 103, thereby decreasing the coefficient of friction at the rim 103. When the adjusting mechanism 120C is operated in the second state, the coils 412 generate a first magnetic field and, thus, the viscosity of the MR fluid 410 is increased to be greater than the viscosity of the MR fluid 410 when in the first state. Thus, the greater viscosity of the MR fluid 410 increases resistance of the sphere 402 from rotating within the opening 404 of the rim 103, thereby increasing the coefficient of friction at the rim 103. Further, when the adjusting mechanism 120C is in the default state, the coils 412 generate a second magnetic field less than the first magnetic field generated by the coils 412 when in the second state such that the MR fluid 410 has a viscosity less than the viscosity of the MR fluid 410 when in the second state, but greater than the viscosity of the MR fluid 410 when in the first state. The sphere 402 contacting the MR fluid 410 having a viscosity between the viscosity of the MR fluid 410 in the first state and the second state results in a resistance of the sphere 402 such that the coefficient of friction at the rim 103 is between that exhibited when in the first state and the second state.

Figure 5:
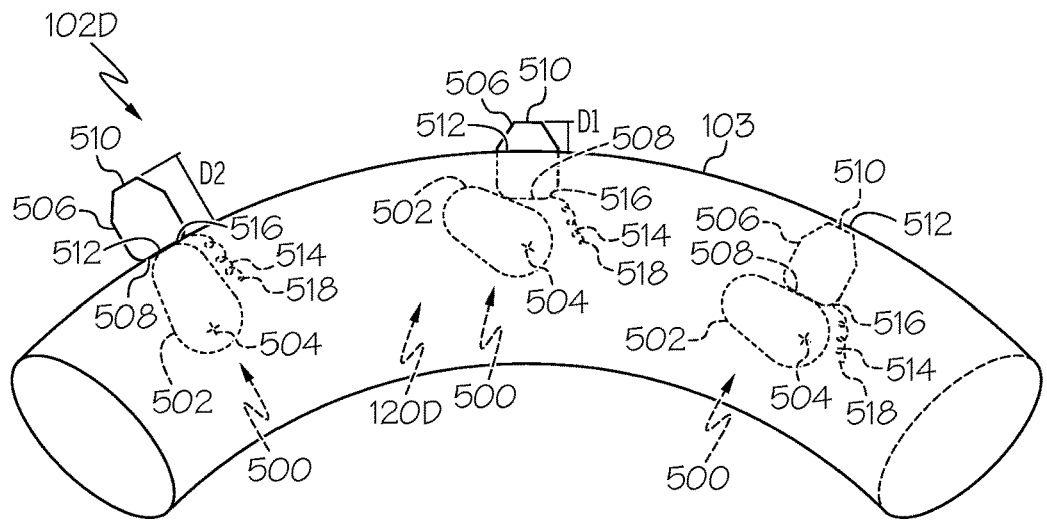
FIG. 5 schematically depicts a partial front view of an embodiment of a steering wheel of the vehicle according to one or more embodiments shown and described herein.

Referring now to FIG. 5, another illustrative embodiment of the steering wheel 102 depicted as steering wheel 102D is shown. A partial view of the rim 103 of the steering wheel 102D is shown including another illustrative embodiment of the adjusting mechanism 120 depicted as adjusting mechanism 120D. The adjusting mechanism 120D includes a plurality of pistons 500 spaced apart from one another and extending radially through the cavity of the rim 103 of the steering wheel 102D. Each piston 500 includes a cam shaft 502 rotatable within the rim 103 about an axis of rotation 504, and a protrusion 506. As shown, the cam shaft 502 has an elliptical geometry with the axis of rotation 504 located proximate one end of the cam shaft 502, however, the present disclosure is not limited to this specific embodiment and other geometries may be utilized. In embodiments, the protrusion 506 has a rounded first end 508 that contacts the cam shaft 502, and an opposite second end 510 that is configured to protrude through an opening 512 of the rim 103. In embodiments, the second end 510 of the protrusion 506 has a specific geometry, for example, squared off edges, that results in an increased coefficient of friction between the second end 510 of the protrusion 506 and driver's hand when in contact with one another. However, the second end 510 of the protrusion 506 may be provided with any other suitable geometry or, in some embodiments, a frictional material such as, for example, an adhesive, to increase friction between the protrusion 506 and the driver's hand. As discussed herein, as the cam shaft 502 rotates about the axis of rotation 504, the protrusion 506 is pushed to extend through the opening 512 of the rim 103 to adjust the amount of displacement, i.e., extension, that the protrusion 506 extends from the surface of the rim 103. In embodiments, each piston 500 also includes a spring 514 having a first end 516 fixed to the protrusion 506 and an opposite second end 518 fixed to the rim 103. The spring 514 causes the protrusion 506 to retract back into the rim 103 as the cam shaft 502 rotates about the axis of rotation 504 in a direction to reduce the pushing force against the protrusion 506.

While three pistons 500 are illustrated at a section of the rim 103 in different states, it should be appreciated that, in embodiments, each of the pistons 500 or at least those pistons 500 located within the same section of the rim 103 may be operated at the same state simultaneously. However, for purposes of illustrating the different states, a first piston 500 (right) is shown in the first state, a second piston 500 (left) is shown in the second state, and a third piston 500 (center) is shown in the default state.

With respect to the piston 500 (right) of the adjusting mechanism 120D operating in the first state, the cam shaft 502 of the piston 500 rotates about the axis of rotation 504 in a first direction such that spring 514 retracts the protrusion 506 toward the inner radial surface of the rim 103. As shown, in the first state, the protrusion 506 does not extend through the opening 512 in the rim 103 and, thus, the coefficient of friction at the rim 103 is reduced. Alternatively, with respect to the piston 500 (left) of the adjusting mechanism 120D operating in the second state, the cam shaft 502 rotates about the axis of rotation 504 in an opposite second direction such that the protrusion 506 moves toward the outer radial surface of the rim 103, thereby extending the protrusion 506 through the opening 512 of the rim 103. In the second state, the protrusion 506 has a displacement D2 measured by the amount of extension of the protrusion 506 from the surface of the rim 103. With the increased displacement D2 of the protrusion 506, the coefficient of friction at the rim 103 is increased. Even in embodiments in which the protrusion 506 does extend through the opening 512 of the rim 103 when in the first state, the displacement D2 of the protrusion 506 when in the second state is greater than the displacement of the protrusion 506 when in the first state. With respect to the piston 500 (center) of the adjusting mechanism 120D operating in the default state, the cam shaft 502 is rotated about the axis of rotation 504 in either the first direction or the second direction such that the protrusion 506 extends through the opening 512 of the rim 103 to provide a displacement D1, which is less than the displacement D2 of the protrusion 506 when in the second state and greater than a displacement of the protrusion 506, if any, when in the first state. The displacement D1 being less than the displacement D2 provides a coefficient of friction at the rim 103 between that exhibited when in the first state and the second state. When transitioning from the second state to either the first state or the default state, the spring 514 draws the protrusion 506 back into the cavity of the rim 103 to reduce the amount of displacement of the protrusion 506.

Figure 6:
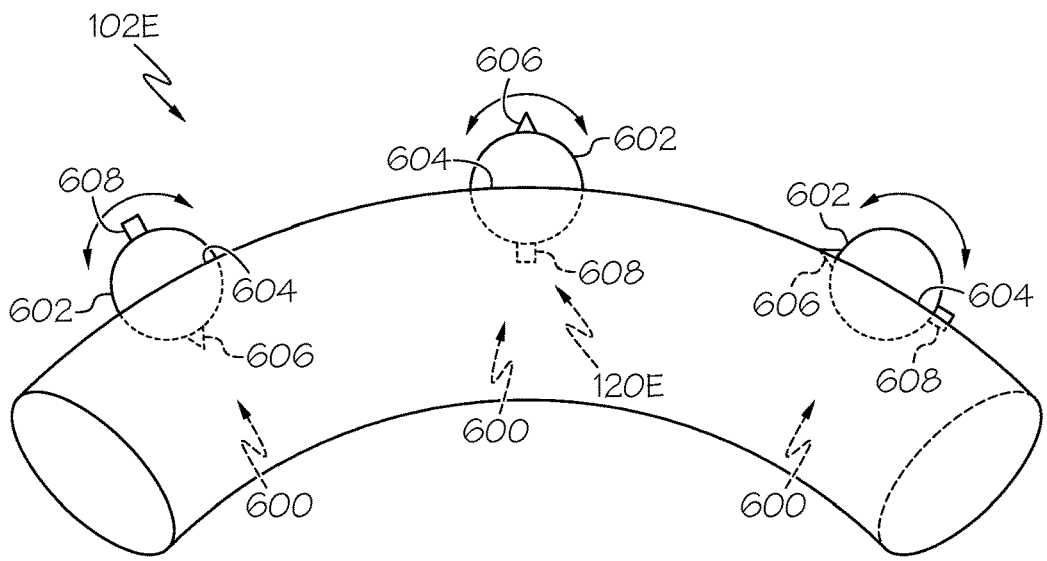
FIG. 6 schematically depicts a partial front view of an embodiment of a steering wheel of the vehicle according to one or more embodiments shown and described herein.

Referring now to FIG. 6, another illustrative embodiment of the steering wheel 102 is depicted as steering wheel 102E. A partial view of the rim 103 of the steering wheel 102E is shown including another illustrative embodiment of adjusting mechanism 120 depicted as adjusting mechanism 120E. The adjusting mechanism 120E includes a plurality of rotation devices 600 spaced apart from one another. Each rotation device 600 includes a rotatable sphere 602 protruding out of an opening 604 formed in the surface of the rim 103 such that the sphere 602 makes contact with the hand of a driver on the rim 103. Each sphere 602 includes a plurality of protrusions extending from a surface of the sphere 602 that provide varying coefficients of friction. In embodiments, a first protrusion 606 provides a first coefficient of friction utilized when the adjusting mechanism 120E is in the default state, and a second protrusion 608 provides a second coefficient of friction, which is greater than the first coefficient of friction, utilized when the adjusting mechanism 120E is in the second state. In embodiments, each rotation device 600 includes an actuating device (not shown), such as a motor or the like, for rotating and fixing the sphere 602 in one of a plurality of positions such that a corresponding one of the plurality of protrusions 606, 608 are exposed and in contact with the driver's hand.

While three rotation devices 600 are illustrated at a section of the rim 103 in different states, it should be appreciated that, in embodiments, each of the rotation devices 600 or at least those rotation devices 600 located within the same section of the rim 103 may be operated at the same state simultaneously. However, for purposes of illustrating the different states, a first rotation device 600 (right) is shown in the first state, a second rotation device 600 (left) is shown in the second state, and a third rotation device 600 (center) is shown in the default state.

With respect to the rotation device 600 (right) of the adjusting mechanism 120E operating in the first state, the sphere 602 is rotated into a position such that none of the protrusions 606, 608 is oriented opposite the surface of the rim 103 to contact the driver's hand. With the sphere 602 rotated such that no protrusion is provided, the coefficient of friction is reduced to provide the smallest coefficient of friction at the rim 103. Alternatively, with respect to the rotation device 600 (left) of the adjusting mechanism 120E operating in the second state, the sphere 602 is rotated such that the second protrusion 608, illustrated as having a square geometry, is oriented opposite the surface of the rim 103 to contact the driver's hand. The second protrusion 608 provides a coefficient of friction that is greater than that exhibited when in the first state in which no protrusion is provided. With respect to the rotation device 600 (center) of the adjusting mechanism 120E operating in the default state, the sphere 602 is rotated such that the first protrusion 606, illustrated as having a triangular geometry, is oriented opposite the surface of the rim 103 to contact the driver's hand. The first protrusion 606 provides a coefficient of friction that is greater than that exhibited when in the first state, in which no protrusion is provided, but less than that exhibited when in the second state, in which the square second protrusion 608 is provided. It should be appreciated that the various geometries of the protrusions 606, 608 disclosed herein are provided for illustrative purposes only and other geometries are within the scope of the disclosure. For example, the protrusions may have a semi-circular geometry, a linear geometry, or may include a plurality of parallel features. In addition, the protrusions may include frictional materials such as, for example, adhesives or the like.

Figure 7:
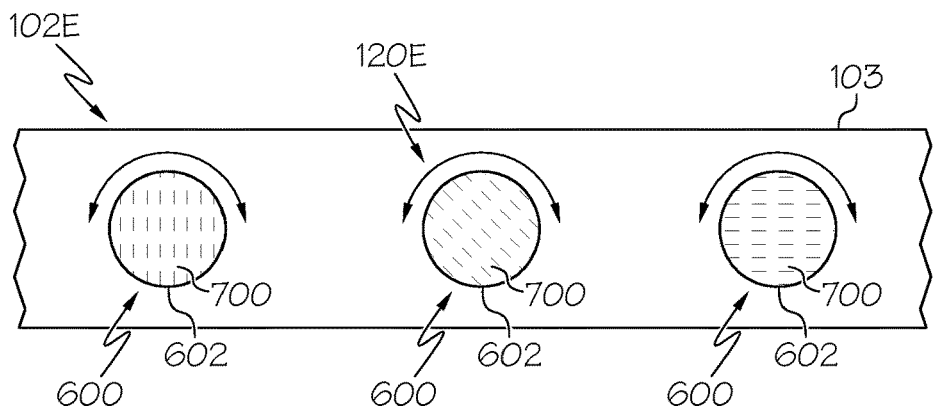
FIG. 7 schematically depicts a partial top view of the steering wheel of FIG. 6 according to one or more embodiments shown and described herein.

Referring now to FIG. 7, a top view of the rim 103 of the steering wheel 102E is shown including the adjusting mechanism 120E. However, rather than the protrusions having different geometries, the protrusions of each sphere 602 include a plurality of parallel features 700. With respect to the rotation device 600 (right) of the adjusting mechanism 120E operating in the first state, the sphere 602 is rotated into a position such that the parallel features 700 are oriented to extend along a circumferential direction of the rim 103. This reduces the coefficient of friction to provide the smallest coefficient of friction at the rim 103. Alternatively, with respect to the rotation device 600 (left) of the adjusting mechanism 120E operating in the second state, the sphere 602 is rotated into a position such that the parallel features 700 are oriented to extend perpendicular to the circumferential direction of the rim 103. This increases the coefficient of friction to that greater than the coefficient of friction exhibited when in the first state. With respect to the rotation device 600 (center) of the adjusting mechanism 120E operating in the default state, the sphere 601 is rotated such that the parallel features 700 are oriented in a direction between that exhibited in the first state and the second state. This provides a coefficient of friction greater than the coefficient of friction exhibited when in the first state, but less than that exhibited when in the second state.

Figure 8:
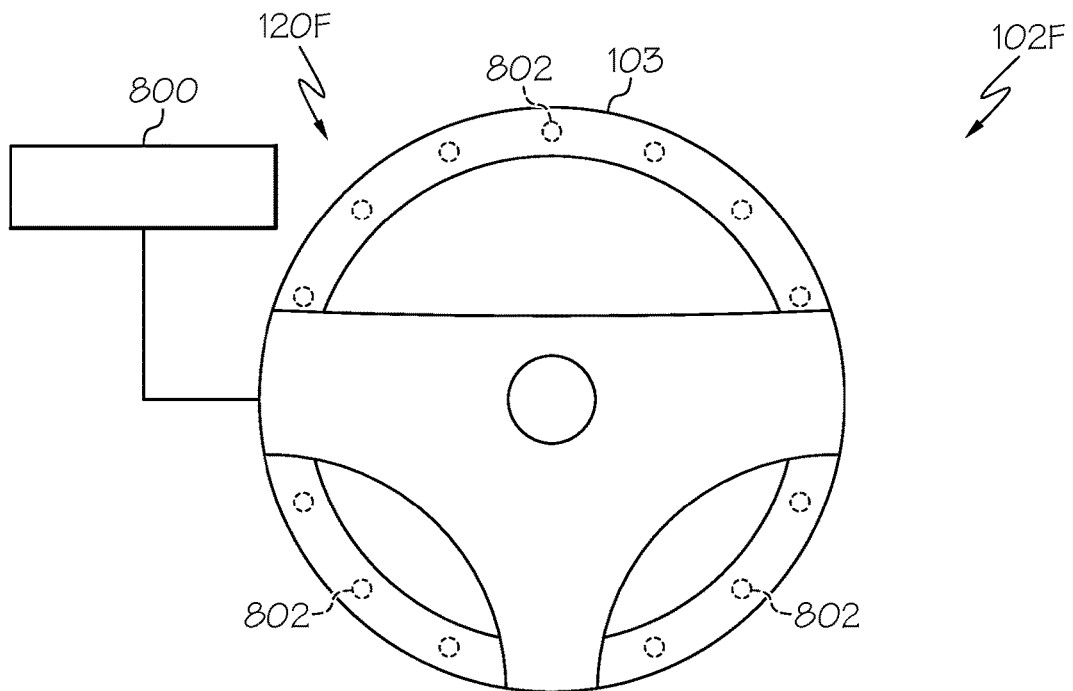
FIG. 8 schematically depicts a front view of an embodiment of a steering wheel of the vehicle according to one or more embodiments shown and described herein.

Referring now to FIG. 8, another illustrative embodiment of the steering wheel 102 is depicted as steering wheel 102F. A partial view of the rim 103 of the steering wheel 102F is shown including another illustrative embodiment of the adjusting mechanism 120 depicted as adjusting mechanism 120F. The adjusting mechanism 120F includes a power supply 800 and a plurality of vibration devices 802 electrically connected to the power supply 800. The vibration devices 802 are spaced apart from one another and positioned along the rim 103 of the steering wheel 102F. The vibration devices 802 may be positioned on or within the rim 103. In embodiments, the vibration device 802 are configured to provide ultrasonic vibrations at the rim 103. Accordingly, each vibration device 802 may include an ultrasonic transducer for converting energy from the power supply 800 into ultrasonic vibration. More specifically, in embodiments, the ultrasonic transducer may be gas-driven, pneumatic, or liquid-driven such as, for example, a hydrodynamic oscillator. The ultrasonic transducer may also include an electromechanical transducer including a piezoelectric and/or a magnetostrictive device. Based on one or more of the operating parameters of the power supply 800 and the vibration devices 802, the vibration devices 802 provide ultrasonic vibration to the rim 103 of the steering wheel 102F at a specific vibration frequency. The coefficient of friction at the rim 103 is dependent on the vibration frequency provided by the vibration devices 802. For example, a lower vibration frequency provides a greater coefficient of friction than the coefficient of friction provided by a greater vibration frequency.

When the adjusting mechanism 120F is in the first state, the vibration devices 802 are configured to operate at a first vibration frequency to vibrate the rim 103 of the steering wheel 102F. When the adjusting mechanism 120F is in the second state, the vibration devices 802 are configured to provide no ultrasonic vibration or, alternatively, operate at a second vibration frequency to vibrate the rim 103 of the steering wheel 102F. The second vibration frequency is less than the first vibration frequency such that the coefficient of friction at the rim 103 when in the second state is greater than the coefficient of friction at the rim 103 when in the first state. Additionally, when the adjusting mechanism 120 is in the default state, the vibration devices 802 are configured to operate at a third vibration frequency to vibrate the rim 103 of the steering wheel 102F. The third vibration frequency is less than the first vibration frequency, but greater than the second vibration frequency. Thus, the coefficient of friction at the rim 103 when operating at the default state is greater than that exhibited when in the first state, but less than that exhibited when in the second state.

Figure 9:
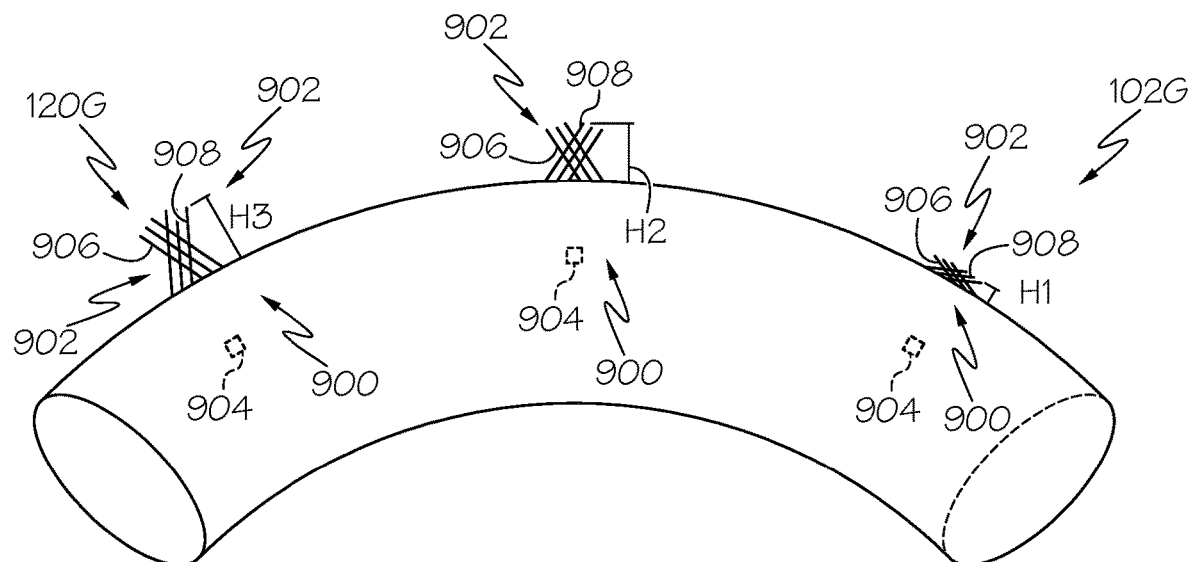
FIG. 9 schematically depicts a partial front view of an embodiment of a steering wheel of the vehicle according to one or more embodiments shown and described herein.

Referring now to FIG. 9, another illustrative embodiment of the steering wheel 102 is depicted as steering wheel 102G. A partial view of the rim 103 of the steering wheel 102G is shown including another illustrative embodiment of the adjusting mechanism 120 depicted as adjusting mechanism 120G. The adjusting mechanism 120G includes a plurality of fiber devices 900. Each fiber device 900 includes a plurality of fiber arrays 902 and one or more corresponding electromagnetic coils 904. The coils 904 receive power from a separate power supply (not shown) to generate a magnetic field directed toward a corresponding fiber array 902. The plurality of fiber arrays 902 are arranged in a spaced apart relation from one another and positioned on the outer radial surface of the rim 103 such that the driver's hand contacts the fiber arrays 902 when operating the steering wheel 102G. Each fiber array 902 includes a first plurality of fibers 906 extending in a first circumferential direction along the rim 103 and a second plurality of fibers 910 extending in an opposite second circumferential direction along the rim 103. The first plurality of fibers 908 and the second plurality of fibers 910 are arranged to overlap one another and cross in opposite directions, as shown. The plurality of fibers 908, 910 either include, are formed from, or are coated with a magnetic material configured to repel an externally applied magnetic field. In embodiments, the magnetic material is a diamagnetic material such as, for example, zinc, copper, silver, or the like. Alternatively, the magnetic material may be selected from one or more of iron, aluminum, nickel, and cobalt.

While three fiber devices 900 are illustrated at a section of the rim 103 in different states, it should be appreciated that, in embodiments, each of the fiber devices 900 or at least those fiber devices 900 located within the same section of the rim 103 may be operated at the same state simultaneously. However, for purposes of illustrating the different states, a first fiber device 900 (right) is shown in the first state, a second fiber device 900 (left) is shown in the second state, and a third fiber device 900 (center) is shown in the default state.

With respect to the fiber device 900 (right) of the adjusting mechanism 120G operating in the first state, the coil 904 does not generate a magnetic field and, thus, the fibers 906, 908 of the corresponding fiber array 902 are not repelled away from the coil 904. As shown, the fiber array 902 when in the first state has a height H1, indicating a total amount of repulsion measured between the surface of the rim 103 and an opposite end of the fibers. With respect to the fiber device 900 (left) of the adjusting mechanism 120G operating in the second state, the coil 904 generates a first magnetic field and, thus, the fibers 906, 908 of the corresponding fiber array 900 are repelled away from the coil 904. As shown, the fiber array 902 when in the second state has a height H3, which is greater than the height H1 when in the first state. It should be appreciated that the increased height of the fiber array 902 provides an increased coefficient of friction at the rim 103. Thus, the adjusting mechanism 120G provides an increased coefficient of friction at the rim 103 when operating in the second state as compared to the coefficient of friction at the rim 103 when operating in the first state. Additionally, with respect to the fiber device 900 (center) of the adjusting mechanism 120G operating in the default state, the coil 904 generates a second magnetic field less than the first magnetic field and, thus, the fibers 906, 908 of the corresponding fiber array 902 are repelled away from the coil 904. As shown, the fiber array 902 when in the default state has a height H2, which is greater than the height H1 when in the first state, but less than the height H3 when in the second state. Accordingly, the coefficient of friction at the rim 103 when in the default state is greater than the coefficient of friction exhibited when in the first state, but less than the coefficient of friction exhibited when in the second state.

Figure 10:
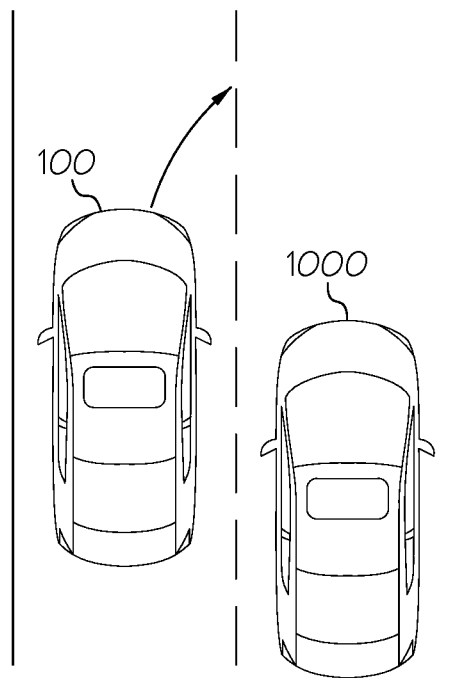
FIG. 10 schematically depicts a plan view of the vehicle performing a lane change operation with another vehicle in the adjacent lane according to one or more embodiments shown and described herein.

Referring now to FIG. 10, with reference to the vehicle 100 and vehicle system 104 in FIG. 1, the vehicle 100 is switching lanes by turning the steering wheel 102 clockwise. In this example, another vehicle 1000 is in a right lane, and the action of the driver switching to the right lane may not be desirable, i.e., an incorrect turning operation. In this case, the vehicle 100 may detect the vehicle 1000 in the right lane using its one or more sensors 118, and the adjusting mechanism 120 may be operated in the first state such that the coefficient of friction at the rim 103 is reduced. Thereafter, the actuator 121 of the steering wheel 102, discussed herein, may be operated to perform an intervening operation and apply torque in the opposite, counterclockwise direction against the turning operation of the driver. In this embodiment, reducing the coefficient of friction at the steering wheel 102 loosens contact with the hands of the driver, which permits the steering wheel 102 to be operated (e.g., turning counterclockwise by the actuator 121) against the driver's intention. Reducing the coefficient of friction at the rim 103 may allow the vehicle 100 to easily intervene the driver's control without harming or distracting the driver.

Figure 11:
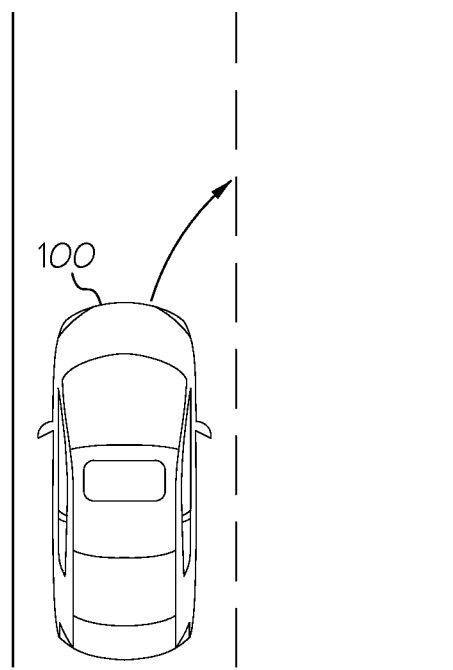
FIG. 11 schematically depicts a plan view of the vehicle performing a lane change operation with no vehicle in the adjacent lane according to one or more embodiments shown and described herein.

Referring now to FIG. 11, the vehicle 100 is switching lanes by turning the steering wheel 102 clockwise. In this example, no vehicle is in the right lane, and thus the driver of the vehicle 100 is making a proper action. In this case, the vehicle 100 may detect no vehicle in the right lane using its one or more sensors 118, and the adjusting mechanism 120 is operated in the second state, thereby increasing the coefficient of friction at the rim 103 to that greater than exhibited when in the first state. As a result, when the actuator 121 is operated to perform an augment operation and apply torque in the same, clockwise direction the friction between the rim 103 and the grip of the driver is increased, thereby increasing control of the rim 103 and torque by the driver. While FIGS. 10 and 11 illustrate an example of the vehicle 100 switching lanes, the features of increasing or decreasing the coefficient of friction at the rim 103 of the steering wheel 102 may be applied where the driver makes a turn at an intersection, makes a U-turn, and the like.

Figure 12:
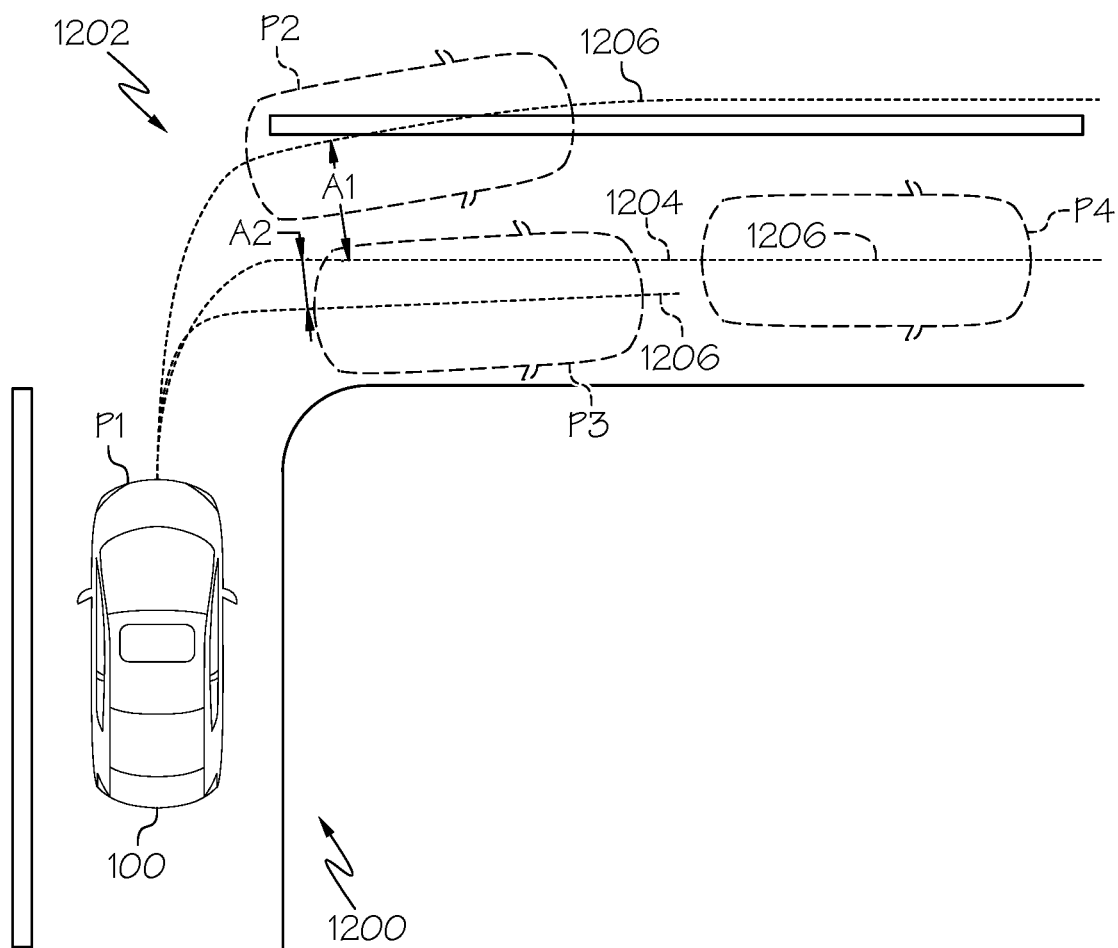
FIG. 12 schematically depicts a plan view of the vehicle driving on a roadway at various positions according to one or more embodiments shown and described herein.

Referring now to FIG. 12, the vehicle 100 is illustrated driving on a roadway 1200 and performing a turning operation. The roadway 1200 includes a driving segment 1202 including a turn. However, it should be appreciated that the present disclosure is not limited to the specific roadway disclosed herein including a turn. For example, the present disclosure may be equally applicable when changing lanes, avoiding obstacles, and the like. A target path 1204 is illustrated indicating a correct position of the vehicle 100 while traveling along the driving segment 1202 and performing the turning operation. As discussed herein, the target path 1204 may be determined by the environment data collected by the network interface hardware 114, the location sensor 116, and the one or more sensors 118 of the vehicle system 104 shown in FIG. 1. In addition, various alternative positions of the vehicle 100 are illustrated in phantom traveling along the driving segment 1202.

As shown in FIG. 12, a first position P1 of the vehicle 100 is illustrated on the roadway 1200 prior to the vehicle 100 entering the driving segment 1202 and initiating the turning operation. At the first position P1, the adjusting mechanism 120 is in the default state providing a coefficient of friction at the rim 103 between that which is exhibited when in the first state and the second state. As the vehicle 100 continues along the roadway 1200, enters the driving segment 1202, and begins to perform the turning operation, as shown at a second position P2, an actual path 1206 of the vehicle 100 deviates from the target path 1204 by a deviation factor of A1. As a result, the adjusting mechanism 120 may be operated to the second state such that the coefficient of friction at the rim 103 may be increased. In addition, the actuator 121 of the steering wheel 102 may be operated to perform an augment operation and apply additional torque to the steering wheel 102 to direct the vehicle 100 toward the target path 1204. By increasing the coefficient of friction as the actuator 121 performs the augment operation, this helps the driver turn the steering wheel 102 clockwise further such that the vehicle 100 may follow the path 1204. Alternatively, in the embodiment illustrated, when in the position P3, the adjusting mechanism 120 is operated in the first state such that the coefficient of friction at the rim 103 is reduced to be less than the coefficient of friction in the default state and the second state. In this embodiment, by reducing the coefficient of friction at the rim 103, the friction between the grip of the driver and the rim 103 is reduced. Thus, when the actuator 121 performs an intervening operation to rotate the steering wheel 102 in an opposite direction toward the target path 1204, the driver provides less resistance against the turning of the steering wheel 102.

In embodiments, the change in the coefficient of friction at the rim 103 from the default state to the first state or the second state may be based on a magnitude of the deviation factor. For example, although not shown, the change in the coefficient of friction at the rim 103 when the vehicle 100 is in the second position P2 may be greater than the change in the coefficient of friction at the rim 103 when the vehicle 100 is in the third position P3 since the deviation factor A1 of the vehicle 100 in the second position P2 is greater than the deviation factor A2 of the vehicle 100 in the third position P3. Thus, it should be appreciated that increased change of the coefficient of friction at the rim 103 from the default state indicates that the vehicle 100 is further from the target path 1204.

Further, in embodiments, it should be appreciated that the adjusting mechanism 120 will be operated in the first state when the deviation factor exceeds a threshold deviation, thereby indicating that the vehicle 100 is in an incorrect position or performing an incorrect driving operation. Once the driving operation is completed, the adjusting mechanism 120 returns to the default state, as shown in FIG. 12 when the vehicle 100 is at a fourth position P4 and traveling along the target path 1204. It should be appreciated that these driving parameters may be adjusted or selected by the driver using the control device 122 of the vehicle system 104, as shown in FIG. 1.

Figure 13:
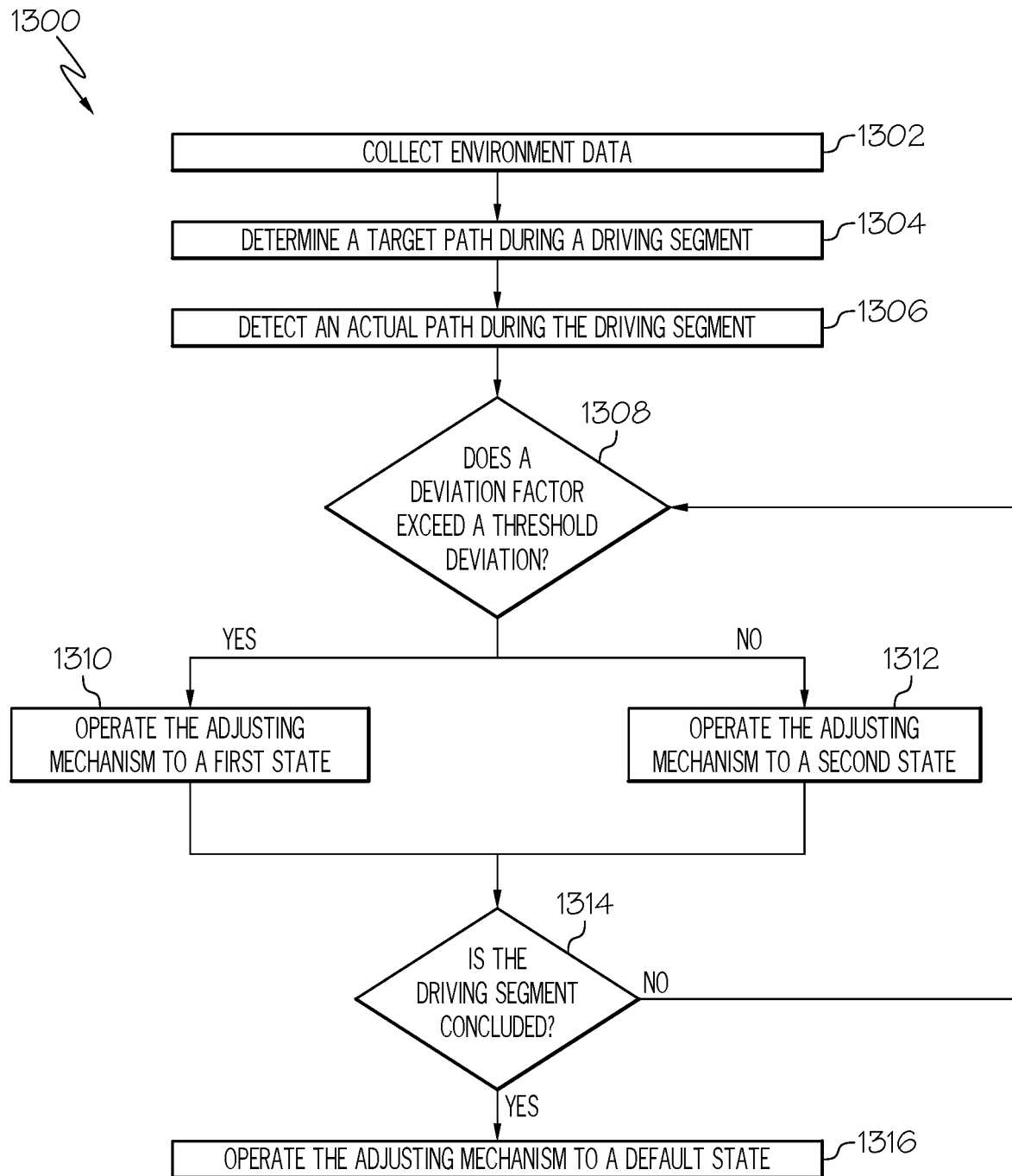
FIG. 13 schematically depicts a flowchart of a method for operating the steering wheel according to one or more embodiments shown and described herein.

Referring now to FIG. 13, with reference to the vehicle 100 and the vehicle system 104 in FIG. 1, a method 1300 of operation for the adjusting mechanism 120 of the vehicle 100 is described in more detail.

Initially, at step 1302, the vehicle 100 system collects environment data such as, for example, navigation instructions, a position of the vehicle 100, other vehicles, vehicle, obstacles, such as a pedestrian, lane lines, and the like. The environment data may be collected by the network interface hardware 114 receiving navigation instructions and road information, the location sensor 116 to determine a location of the vehicle 100, and the one or more sensors 118 to detect objects on a roadway relative to the vehicle 100. Based on the environment data collected in step 1302, the vehicle system 104 determines a target path at step 1304 during one or more driving segments of a roadway. For example, a particular driving segment may include a turn in the roadway and the target path may be a path extending through a middle of the lane of the driving segment. At step 1306, the vehicle system 104 detects an actual path of the vehicle 100 based on the location sensor 116 and/or the one or more sensors 118.

At step 1308, the vehicle system 104 determines whether a deviation factor between the target path and the actual path of the vehicle 100 exceeds a threshold deviation, e.g., when an incorrect driving operation or an obstacle is detected. As noted above, the threshold deviation may be set by the driver of the vehicle 100 by operating the control device 122. Thus, in instances in which the driver chooses to reduce the frequency of operating the adjusting mechanism 120 to the first state, thereby reducing the coefficient of friction at the rim 103, the driver may increase the threshold deviation. In doing so, the vehicle system 104 may permit a larger range of deviation between the target path and the actual path before operation the adjusting mechanism 120 to reduce the coefficient of friction at the rim 103 of the steering wheel 102. Alternatively, the driver may reduce the threshold deviation such that the adjusting mechanism 120 is operated to the first state more frequently in response to the vehicle 100 deviating from the target path.

If the vehicle system 104 determines at step 1308 that the deviation factor exceeds the threshold deviation, the method 1300 proceeds to step 1310 and the adjusting mechanism 120 actuates to adjust the adjusting mechanism 120 to the first state, thereby reducing the coefficient of friction at the rim 103. Further, as discussed herein, it is contemplated that the degree of adjustment from the default state to the first state may be based on the specific deviation factor. As such, a smaller deviation factor will result in a smaller degree of adjustment toward the first state as compared to a degree of adjustment toward the first state when exhibiting a larger deviation factor.

Alternatively, if the vehicle system 104 determines at step 1308 that the deviation factor does not exceed the threshold deviation during the driving operation, the method 1300 proceeds to step 612 and the adjusting mechanism 120 is operated to the second state, thereby increasing the coefficient of friction at the rim 103. It should be appreciated that, in embodiments, the adjusting mechanism 120 is only operated to the first state or the second state if a corresponding intervening or augment operation is to be performed by the actuator 121.

In either instance, the method 1300 proceeds to step 1314 to determine whether the driving segment, for example, the turning operation is complete or an obstacle is no longer present. If it is not determined that the driving segment is complete at step 1314, the method 1300 returns to step 1308 to continue to monitor the deviation factor while the vehicle 100 is driving along the driving segment. Thus, even when the rim 103 is initially adjusted to the second state when the deviation factor does not exceed the threshold deviation, i.e., the vehicle 100 is within range of the target path, the adjusting mechanism 120 may be adjusted toward the first state as the vehicle 100 begins to move away from the target path and the deviation factor begins to exceed the threshold deviation. Similarly, if the rim 103 is initially adjusted to the first state to indicate that the deviation factor is greater than the threshold deviation, i.e., the vehicle 100 is outside of range of the target path, the adjusting mechanism 120 may be adjusted toward the second state as the vehicle 100 moves within range the target path and the deviation factor becomes less than the threshold deviation. Alternatively, if it is determined at step 1314 that the driving segment is concluded, for example, the vehicle 100 has completed the turning operation, the adjusting mechanism 120 is operated back to the initial default state at step 1316 until the vehicle 100 approaches another driving segment.

From the above, it is to be appreciated that defined herein are vehicle systems, steering wheels, and methods for operating a steering wheel to adjust a coefficient of friction between a surface of the steering wheel and a driver's hands.

In situations in which the driver is incorrectly steering the vehicle, the coefficient of friction at the surface of the steering wheel may be reduced such that the vehicle may perform an intervening operation and adjust a steering direction of the steering wheel with reduced resistance from the driver.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A steering wheel comprising:
    a rim; and
    an adjusting mechanism for adjusting a coefficient of friction between a surface of the rim and a driver's hand, the adjusting mechanism comprising a plurality of rotation devices spaced apart from one another, each rotation device including a rotatable sphere protruding out of the surface of the rim,
    wherein a resistance to rotation of the rotatable spheres is decreased when the adjusting mechanism is in a first state, the resistance to rotation of the rotatable spheres is increased when the adjusting mechanism is in a second state.

2. The steering wheel of claim 1, wherein each rotation device further comprises:
    a housing defining a sealed cavity between the rotatable sphere and the housing; and
    magnetorheological fluid provided within the sealed cavity.

3. The steering wheel of claim 2, further comprising:
    one or more coils configured to generate a magnetic field to adjust a viscosity of the magnetorheological fluid, wherein:
    the viscosity of the magnetorheological fluid is decreased when the adjusting mechanism is in the first state, and
    the viscosity of the magnetorheological fluid is increased when the adjusting mechanism is in the second state.

4. The steering wheel of claim 1, wherein each rotation device further comprises:
    a shaft;
    a plate threadedly attached to the shaft; and
    a spring positioned between the plate and the rotatable sphere.

5. The steering wheel of claim 4, wherein the plate is movable in a first direction toward the spring for decreasing the resistance and in an opposite second direction for increasing the resistance.

6. The steering wheel of claim 1, further comprising:
    one or more sensors; and
    a controller configured to:
        determine whether a deviation factor between a target driving path and an actual driving path of a vehicle during a driving segment exceeds a threshold deviation based on the one or more sensors; and
        operate the adjusting mechanism of the steering wheel of the vehicle to the first state in response to determining that the deviation factor exceeds the threshold deviation, thereby decreasing the coefficient of friction between the surface of the rim of the steering wheel and the driver's hand.

7. The steering wheel of claim 6, further comprising an actuator to apply a torque to the rim of the steering wheel in response to determining that the deviation factor exceeds the threshold deviation.

8. The steering wheel of claim 6, wherein the controller is configured to:
operate the adjusting mechanism of the steering wheel of the vehicle to the second state in response to determining that the deviation factor does not exceed the threshold deviation, thereby increasing the coefficient of friction between the surface of the rim of the steering wheel and the driver's hand; and
operate the adjusting mechanism of the steering wheel of the vehicle to a default state in which between the first state and the second state in response to determining that the driving segment is completed.

9. A steering wheel comprising:
a rim; and
an adjusting mechanism for adjusting a coefficient of friction between a surface of the rim and a driver's hand, the adjusting mechanism comprising a plurality of rotation devices spaced apart from one another, each rotation device comprising:
a rotatable sphere protruding out of the surface of the rim;
a shaft;
a plate threadedly attached to the shaft; and
a spring positioned between the plate and the rotatable sphere,
wherein the plate is movable in a first direction toward the spring for decreasing a resistance to rotation of the rotatable spheres and in an opposite second direction for increasing the resistance to rotation of the rotatable spheres.

10. The steering wheel of claim 9, wherein the resistance to rotation of the rotatable spheres is decreased when the adjusting mechanism is in a first state, the resistance to rotation of the rotatable spheres is increased when the adjusting mechanism is in a second state.

11. The steering wheel of claim 10, wherein the spring has a first length when in the first state greater than a second length of the spring when in the second state.

12. The steering wheel of claim 10, wherein the adjusting mechanism is positionable into a default state to provide a resistance greater than the resistance to rotation when in the first state and less than the resistance to rotation when in the second state.

13. The steering wheel of claim 9, further comprising:
one or more sensors; and
a controller configured to:
determine whether a deviation factor between a target driving path and an actual driving path of a vehicle during a driving segment exceeds a threshold deviation based on the one or more sensors; and
operate the adjusting mechanism of the steering wheel of the vehicle to a first state in response to determining that the deviation factor exceeds the threshold deviation, thereby decreasing the coefficient of friction between the surface of the rim of the steering wheel and the driver's hand.

14. The steering wheel of claim 13, further comprising an actuator to apply a torque to the rim of the steering wheel in response to determining that the deviation factor exceeds the threshold deviation.

15. The steering wheel of claim 13, wherein the controller is configured to:
operate the adjusting mechanism of the steering wheel of the vehicle to a second state in response to determining that the deviation factor does not exceed the threshold deviation, thereby increasing the coefficient of friction between the surface of the rim of the steering wheel and the driver's hand; and
operate the adjusting mechanism of the steering wheel of the vehicle to a default state in which between the first state and the second state in response to determining that the driving segment is completed.

16. A steering wheel comprising:
a rim; and
an adjusting mechanism for adjusting a coefficient of friction between a surface of the rim and a driver's hand, the adjusting mechanism comprising a plurality of rotatable spheres devices protruding out of the surface of the rim spaced apart from one another, each rotatable sphere including a plurality of parallel features,
wherein the plurality of parallel features of each rotatable sphere is oriented in a first direction when the adjusting mechanism is in a first state, and
wherein the plurality of parallel features of each rotatable sphere is oriented in a second direction when the adjusting mechanism is in a second state.

17. The steering wheel of claim 16, wherein the first direction extends along a circumferential direction of the rim of the steering wheel and the second direction is perpendicular to the first direction.

18. The steering wheel of claim 16, wherein the coefficient of friction between the surface of the rim and the driver's hand when in the first state is less than the coefficient of friction between the surface of the rim and the driver's hand when in the second state.

19. The steering wheel of claim 16, further comprising:
one or more sensors; and
a controller configured to:
determine whether a deviation factor between a target driving path and an actual driving path of a vehicle during a driving segment exceeds a threshold deviation based on the one or more sensors; and
operate the adjusting mechanism of the steering wheel of the vehicle to the first state in response to determining that the deviation factor exceeds the threshold deviation, thereby decreasing the coefficient of friction between the surface of the rim of the steering wheel and the driver's hand.

20. The steering wheel of claim 19, further comprising an actuator to apply a torque to the rim of the steering wheel in response to determining that the deviation factor exceeds the threshold deviation.

* * * * *

UNITED STATES PATENT AND TRADEMARK OFFICE
CERTIFICATE OF CORRECTION

PATENT NO. : 11,548,545 B2
APPLICATION NO. : 17/573075
DATED : January 10, 2023
INVENTOR(S) : Manuel Ludwig Kuehner and Jaime Camhi It is certified that error appears in the above-identified patent and that said Letters Patent is hereby corrected as shown below:

On the Title Page

Column 2, item (56), U.S. patent documents, cite no. 4, delete "Zheng" and insert --Zheng et al.--, therefor.

In page 2, Column 1, item (56), U.S. patent documents, cite no. 1, delete "Klausner" and insert --Klausner et al.--, therefor.

Signed and Sealed this
Twenty-first Day of February, 2023

Katherine Kelly Vidal
*Director of the United States Patent and Trademark Office*